(12) United States Patent
Kudo et al.

(10) Patent No.: US 8,584,658 B2
(45) Date of Patent: Nov. 19, 2013

(54) FUEL SUPPLY SYSTEM

(71) Applicant: Honda Motor Co., Ltd., Tokyo (JP)

(72) Inventors: Hirotsugu Kudo, Saitama (JP); Daiko Tsutsumi, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/718,103

(22) Filed: Dec. 18, 2012

(65) Prior Publication Data

US 2013/0174808 A1    Jul. 11, 2013

(30) Foreign Application Priority Data

Dec. 27, 2011    (JP) ................................. 2011-287040

(51) Int. Cl.
*F02B 13/00*    (2006.01)

(52) U.S. Cl.
USPC ........................................................... 123/575

(58) Field of Classification Search
USPC .................. 123/1 A, 304, 543–549, 557, 575
See application file for complete search history.

(56) References Cited

U.S. PATENT DOCUMENTS

| | | | |
|---|---|---|---|
| 3,021,681 A * | 2/1962 | Perry ................................... | 62/7 |
| 4,220,120 A * | 9/1980 | Jackson et al. ..................... | 123/3 |
| 4,836,173 A * | 6/1989 | Stires, Jr. ........................... | 123/522 |
| 6,067,969 A * | 5/2000 | Kemmler et al. ................. | 123/548 |
| 6,622,664 B2 * | 9/2003 | Holder et al. ....................... | 123/3 |
| 8,333,171 B2 * | 12/2012 | Lund .................................. | 123/1 A |
| 2002/0152999 A1 * | 10/2002 | Holder et al. ..................... | 123/575 |

FOREIGN PATENT DOCUMENTS

JP    2007-278298 A    10/2007
JP    2009-203909 A    9/2009

* cited by examiner

*Primary Examiner* — Hung Q Nguyen (74) *Attorney, Agent, or Firm* — Squire Sanders (US) LLP (57) ABSTRACT

In a fuel supply system, at least one of a first negative pressure $P_1$ and a second negative pressure $P_2$ is adjusted such that a width of a negative pressure range $[P_1, P_2]$ of a condenser in a second state, that is, the difference $P_2-P_1$ of the first and second negative pressure, becomes smaller as a concentration $C_2$ of high-octane number component of a raw fuel $F_0$ is lower. A term until the internal atmospheric pressure P of the condenser 30 rises from the first negative pressure $P_1$ to the second negative pressure $P_2$ in a negative pressure control processing, that is, the term which the second state is maintained, is shortened. Therefore, the number of times the negative pressure control process is repeated is increased, thus the increase of an accumulated recovery amount of the first fuel $F_1$ with high concentration of high-octane number component is attained.

7 Claims, 9 Drawing Sheets

FUEL SUPPLY SYSTEM

TECHNICAL FIELD

The present invention relates to a system for supplying fuel to an internal combustion engine.

BACKGROUND ART

There is known a method to separate a raw fuel to each of a high-octane number fuel and a low-octane number fuel by a separation device, and to selectively provide the separated fuel to an internal combustion engine (Japanese Patent Laid-open Publication No. 2007-278298 hereinafter referred to as Patent Document 1 and Japanese Patent Laid-open Publication No 2009-203909 hereinafter referred to as Patent Document 2). A housing of the separation device is sectioned into two sections by a separation membrane, and one of the two sections is decompressed by a vacuum pump on an occasion of fuel separation.

DISCLOSURE OF THE INVENTION

Problems to be Solved by the Invention

However, by only decompressing uniformly one of the sections of the separation device, there is a possibility that a recovery efficiency of the high-octane number fuel decreases.

Therefore, it is an object of the present invention to provide a fuel supply system capable of appropriately controlling an operation condition of the separation device from a view point of recovery efficiency of the high-octane number fuel.

Means for Solving the Problem

The present invention relates to a system configured to supply a first fuel which is separated from a raw fuel and containing more high-octane number component than the raw fuel, and a second fuel which is separated from the raw fuel and containing more low-octane number component than the raw fuel or the raw fuel, selectively or by a specified mixing ratio to an internal combustion engine simultaneously.

The fuel supply system according to the present invention for solving the problem comprises: a separation device which is sectioned to a high pressure chamber and a low pressure chamber via a separation membrane, and configured to separate a raw fuel into the first fuel and the second fuel by the separation membrane in a state the low pressure chamber is maintained in a lower pressure than the high pressure chamber, and then to recover the first fuel from the low pressure chamber side and to recover the second fuel from the high pressure chamber side; a condenser which is connected to the section of the low pressure side of the separation device; a first fuel tank connected to the condenser and configured to store the first fuel; an atmospheric pressure adjustment mechanism configured to adjust an internal atmospheric pressure of the condenser; and a controller configured to repeatedly execute a negative pressure control processing by controlling an operation of the atmospheric pressure adjustment mechanism, in which, in a first state where the condenser is interrupted from the separation device and the first fuel tank, the condenser is decompressed to a first negative pressure and then the decompression of the condenser is stopped, and subsequently in a second state where the condenser is communicated to the separation device while interrupted from the first fuel tank, the internal atmospheric pressure of the condenser is raised to a second negative pressure, and then in a third state where the condenser is interrupted from the separation device while communicated to the first fuel tank, the decompression of the condenser is also stopped, wherein the controller is configured to adjust at least one of the first negative pressure and the second negative pressure so as to make a difference between the first negative pressure and the second negative pressure smaller as a concentration of the high-octane number component of the raw fuel is lower.

According to the fuel supply system of the present invention, the first fuel (high-octane number fuel) in a gas phase flows into the condenser from the separation device in the second state, and there is a tendency that a fuel separation efficiency by the separation device gradually decreases as the internal atmospheric pressure (negative pressure) of the condenser rises. This tendency is prominent as the concentration of the high-octane number component of the raw fuel is lower.

Therefore, at least one of the first negative pressure and the second negative pressure is adjusted so that a width of a negative pressure range of the condenser in the second state, that is, the difference between the first negative pressure and the second negative pressure becomes smaller, as the concentration of the high-octane value component of the raw fuel is lower. By this, the term for the internal atmospheric pressure of the condenser rises from the first negative pressure to the second negative pressure in the negative pressure control process, that is, the term of the second state being maintained, is shortened.

Therefore, in spite of the high probability that the fuel separation efficiency by the separation device is low, a situation in which the second state is maintained vainly for a long time, is avoided. Furthermore, to the extent that such term is shortened, the number of times the negative pressure control process is repeated is increased, thus the increase of an accumulated recovery amount of the first fuel is attained. Accordingly, as the operation condition of the separation device, at least one of the first negative pressure and the second negative pressure can be appropriately adjusted from a view point of improving the recovery efficiency of the first fuel.

In the fuel supply system according to the present invention, it is preferably that the controller is configured to adjust the second negative pressure to be lower as the concentration of the high-octane number component of the raw fuel is lower.

According to the fuel supply system having this configuration, at least the second negative pressure is adjusted to be lower as the concentration of the high-octane number component contained in the raw fuel is lower. By this, the width of the negative pressure range of the condenser in the second state is narrow, and the position of this range is adjusted to the low pressure side. Therefore, a situation where the negative pressure of the condenser in the second state being insufficiently-low can be avoided from a view point of fuel separation efficiency of the separation device. As a result, the recovery rate of the first fuel by the separation device can be improved.

In the fuel supply system according to the present invention, preferably, it is configured that the second fuel separated by the separation device is supplied to a raw fuel tank in which the raw fuel is stored.

According to the fuel supply system having this configuration, since the second fuel separated from the first fuel by the separation device is supplied to the raw fuel tank, the concentration of the high-octane number component of the raw fuel stored in the raw fuel tank changes. According to this, as the operation condition of the separation device as above, at least one of the first negative pressure and the second negative pressure is appropriately adjusted from a view point of improving the recovery efficiency of the first fuel.

It is preferable that the controller is configured to adjust at least one of the first negative pressure and the second negative pressure so that the difference between the first negative pressure and the second negative pressure becomes smaller as a degree of deterioration of the separation device is higher, the degree of deterioration being estimated based on a time-series measurement result of at least one of a concentration of high-octane number component of the first fuel and the concentration of high-octane number component of the raw fuel.

For example, the controller may be configured to adjust at least one of the first negative pressure and the second negative pressure, based on the measurement result of the concentration of high-octane number component of the first fuel, according to a definition that the degree of deterioration of the separation device is higher as a deviation between an estimated concentration of high-octane number component of the first fuel at a future designated time point determined on an assumption that the separation device is normal and a measurement result at the designated time point of the concentration of high-octane number component of the first fuel stored in the first fuel tank, is larger.

Moreover, the controller may be configured to adjust at least one of the first negative pressure and the second negative pressure according to a definition that the degree of deterioration of the separation device is higher as a time rate of change of the concentration of high-octane number component of the raw fuel is lower.

According to the fuel supply system with the above configuration, in a situation that the deterioration of the separation device is advancing and there is a high probability of having difficulty to recover a first fuel containing more high-octane number component, a term of the second state being maintained is shortened. Therefore, it can avoid maintaining the second state vainly for a long time, and due to the shortening of this term, the number of times the negative pressure control process is repeated is increased, thus the improvement of recovery efficiency of the first fuel is attained.

MODE FOR CARRYING OUT THE INVENTION (First Embodiment)
(Configuration)

Figure 1:
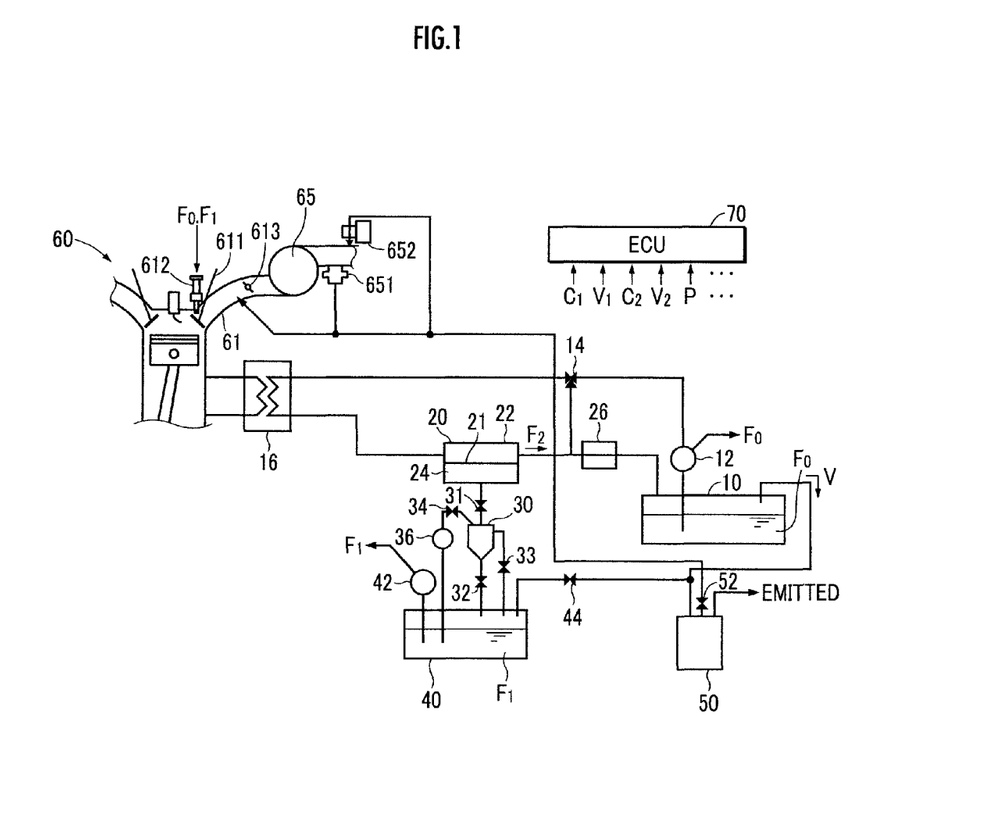
FIG. 1 illustrates an explanatory view showing features of a fuel supply system according to a first embodiment of the present invention.

A fuel supply system as the first embodiment of the present invention shown in FIG. 1 comprises a raw fuel tank (second fuel tank) 10, a separation device 20, a condenser 30, a first fuel tank 40, a canister 50, and an ECU (electronic control unit (controller)) 70. The fuel supply system is installed in the vehicle and is configured to supply fuel to an internal combustion engine 60 which is also installed in the vehicle.

Normal or commercial gasoline provided through a fuel filler is stored as raw fuel $F_0$ in the raw fuel tank 10. The raw fuel $F_0$ stored in the raw fuel tank 10 is supplied to the internal combustion engine 60 after its pressure is raised to a designated atmospheric pressure by a high pressure supply pump 12. A concentration sensor for measuring a concentration $C_2$ of component with high-octane number of raw fuel $F_0$ is provided at the raw fuel tank 10. In a case where the component of high-octane number is alcohol such as ethanol or the like, the concentration sensor is configured by sensors, for example, recited in Japanese Patent Laid-open Publication No. H05-080014 or Japanese Patent Laid-open Publication No. H06-027073.

Furthermore, the raw fuel $F_0$ is sent to the separation device 20 after its pressure is raised to the designated atmospheric pressure by the high pressure supply pump 12, and then being heated by a heater 16. In a case where the raw fuel tank 10 and the heater 16 are intercepted by a three-way valve 14, the raw fuel $F_0$ is returned to the raw fuel tank 10 through a radiator 26 without passing through the separation device 20. The heater 16 is composed of a heat exchanger which exchanges heat of a coolant water of the internal combustion engine 60 and the raw fuel. As an alternative, or in addition to this, the heater 16 can be configured by an electric heater.

By an evaporation of the raw fuel F o stored in the raw fuel tank 10, evaporation fuel V containing hydrocarbon and ethanol is generated. The evaporation fuel V is supplied to the canister 50 from the raw fuel tank 10.

The separation device 20 is configured to separate the raw fuel $F_0$ into a first fuel $F_1$ and a second fuel $F_2$ according to penetrative vaporization (PV (pervaporation)). The separation device 20 comprises a separation membrane 21 which selectively permeates high-octane number component in the raw fuel (gasoline), and a high pressure chamber 22 and a low pressure chamber 24 sectioned by the separation membrane 21 (not shown in the figures).

The first fuel $F_1$ is a high-octane number fuel, for example, alcohol such as ethanol or the like, having more content amount of high-octane number component compared to the raw fuel $F_0$. The second fuel $F_2$ is a low-octane number fuel having less content amount of high-octane number component compared to the raw fuel $F_0$.

In particular, raw fuel $F_0$ in a high temperature and high pressure state is supplied to the high pressure chamber 22 of the separation device 20, while by maintaining the low pressure chamber 24 in a negative pressure state, the high-octane number component contained in the raw fuel $F_0$ permeates the separation membrane 21 and effuses to the low pressure chamber 24. As an amount of high-octane number component in the raw fuel $F_0$ increase, the octane number of the permeating liquid becomes higher. Therefore, the first fuel $F_1$ containing more high octane-number component and having a higher octane number compared to the raw fuel $F_0$ is collected from the low pressure side of the separation membrane 21.

The first fuel $F_1$ flown out from the separation device 20 is stored in the first fuel tank 30. A concentration sensor for measuring the concentration C of the high-octane number component of the first fuel $F_1$ is provided at the first fuel tank 30.

On the other hand, since the amount of high-octane number component contained in the raw fuel $F_0$ flowing through the high pressure chamber 22 decreases as it flows to the down stream, the second fuel $F_2$ containing a small amount of high-octane number component and having a lower octane number compared to the raw fuel $F_0$ remains in the high pressure chamber 22. The second fuel $F_2$ flowing out from the separation device 20 is supplied to the raw fuel tank 10 after being cooled by the radiator 26.

Furthermore, the operating conditions of the separation device 20 such as a temperature of the separation membrane 21, a temperature and a supply amount of the raw fuel $F_0$, and the atmospheric pressure of the high pressure chamber 22 and the atmospheric pressure (negative pressure) of the low pressure chamber 24, or the like is controlled. By this, the separation speed or the collection amount of the first fuel $F_1$ and the second fuel $F_2$ by the separation device 20 changes.

For example, the temperature of the separation membrane 21 can be adjusted by controlling the temperature of the raw fuel $F_0$ supplied to the separation device 20 by the heater 16. Furthermore, the atmospheric pressure of the low pressure chamber 24 can be adjusted according to a depressurization of the condenser 30 by an operation of a vacuum pump 36.

The second fuel $F_2$ may be provided to a second fuel tank (not shown in the figures) different from the raw fuel tank 10, and then stored in the second fuel tank. Moreover, the second fuel $F_2$ stored in the second fuel tank may be supplied to the internal combustion engine 60 instead of the raw fuel $F_0$.

The condenser (negative pressure tank) 30 is provided on the way of a collecting path connecting the low pressure chamber 24 of the separation device 20 and the first fuel tank 40, and is configured to condense the first fuel $F_1$. The condenser 30 is composed of, for example, an air cooling type or a water cooling type tank or a reservoir.

The condenser 30 is connected to the intake side of the vacuum pump (negative pressure pump) 36. The inside of the condenser 30 is controlled to a negative pressure state by the operation of the vacuum pump 36, and to be in a low pressure state compared to a vapor pressure of the first fuel $F_1$. The evaporation fuel V containing alcohol such as ethanol or the like generated by the evaporation of the first fuel $F_1$ is supplied to the canister 50 or the like by the operation of the vacuum pump 36. The condenser 30 is provided with an atmospheric pressure sensor for measuring the internal atmospheric pressure of the condenser.

In a first collecting path connecting the separation device 20 and the condenser 30, a first opening-closing mechanism 31 is provided for opening and closing this path. The low pressure chamber 24 of the separation device 20 and the condenser 30 communicate by opening the first opening-closing mechanism 31. On the other hand, by closing the first opening-closing mechanism 31, the separation device 20 and the condenser 30 are intercepted.

In a secondary collecting path connecting the condenser 30 and the first fuel tank 40, a second opening-closing mechanism 32 is provided for opening and closing this path. The condenser 30 and the first fuel tank 40 communicate by opening the second opening-closing mechanism 32. On the other hand, by closing the second opening-closing mechanism 32, the condenser 30 and the first fuel tank 40 are intercepted.

The condenser 30 and the first fuel tank 40 are connected by a first evaporation fuel path different from the secondary collecting path, and a third opening-closing mechanism 33 is provided in the first evaporation fuel path. By opening the third opening-closing mechanism 33, the evaporation fuel V filling the first fuel tank 40 is introduced to the condenser 30.

The condenser 30 and the first fuel tank 40 are connected through a second evaporation fuel path different from the first evaporation fuel path, and a fourth opening-closing mechanism 34 and the vacuum pump 36 are provided in the second evaporation fuel path. By opening the fourth opening-closing mechanism 34 and by operating the vacuum pump 36, the evaporation fuel V is introduced from the condenser 30 to the first fuel $F_1$ stored in the first fuel tank 40. The four opening-closing mechanisms 31 to 34 and the vacuum pump 36 configure the atmospheric pressure adjustment mechanism of the present invention.

The first fuel $F_1$ separated from the raw fuel $F_0$ by the separation device 20 is stored in the first fuel tank 40. The first fuel $F_1$ stored in the first fuel tank 40 is supplied to the internal combustion engine 60 after having its pressure raised to a designated atmospheric pressure by a high pressure supply pump 42.

By the evaporation of the first fuel $F_1$ stored in the first fuel tank 40, evaporation fuel V containing alcohol such as ethanol or the like is generated. The first fuel tank 40 and the canister 50 are connected and a fifth opening-closing mechanism 44 is provided in this connecting path. By opening the fifth opening-closing mechanism 44, the evaporation fuel V is supplied to the canister 50 from the first fuel tank 40 through the connecting path.

The first fuel tank 40 is provided with an atmospheric pressure sensor (not shown in the figures) for measuring the internal atmospheric pressure thereof.

Each of the opening-closing mechanisms 31 to 34 and 44 is configured of, for example, a solenoid valve.

The canister 50 is embedded with adsorbent material such as activated carbon or the like, and not only alcohol contained in the evaporation fuel V derived from the raw fuel $F_0$ but also hydrocarbon are adsorbed by the adsorbent material. By this, the evaporation fuel V can be separated into alcohol and hydrocarbon, and other components such as nitrogen or the like.

The air containing the separated nitrogen or the like is discharged to outside the vehicle from the canister 50. On the other hand, when the internal combustion engine 60 is activated and an intake pipe 61 becomes a negative pressure state, the alcohol and the hydrocarbon adsorbed to the adsorbent material in the canister 50 are supplied to the intake pipe 61 at the downstream side of a throttle valve 613, and further introduced to a combustion chamber 35, and then combusted. In a discharging path connected to the canister 50, a flow amount adjusting valve 52 for adjusting the flow amount of the evaporation fuel V in the discharging path is provided.

It may be configured that the canister 50 is heated by the condensation heat of the first fuel $F_1$ generated at the condenser 30, and the temperature thereof is maintained within a temperature range which sufficiently exhibit the adsorptive performance of the evaporation fuel V. For example, a flow path of a coolant medium of the condenser 30 may be configured so that the canister 50 is heated by the coolant medium.

The intake pipe 61 connected to the combustion chamber of the internal combustion engine 60 is provided with an intake valve 611, a fuel injection device 612, and a throttle valve 613. By opening the intake valve 611, the intake pipe 61 and the combustion chamber is communicated. On the other hand, by closing the intake valve 611, the intake pipe 61 and the combustion chamber is interrupted. The throttle valve 613 is configured so as to adjust an inhaled air amount of the internal combustion engine 60.

The fuel injection device 612 is arranged between the intake valve 611 and the throttle valve 613 and is configured to inject selectively one of the raw fuel $F_0$ and the first fuel $F_1$ to each cylinder of the internal combustion engine 60. The fuel injection device 612 may also be configured to inject simultaneously both of the raw fuel $F_0$ and the first fuel $F_1$ at a specified mixing ratio to each cylinder of the internal combustion engine 60. A mixed gas of air inhaled to the intake pipe 61 and the fuel injected from the fuel injection device 612 is introduced to the combustion chamber of each cylinder from the intake pipe 61.

In the case the second fuel tank is provided, the fuel injection device 612 may be configured to inject selectively one of the first fuel $F_1$ and the second fuel $F_2$ or inject the both simultaneously at a specified mixing ratio to each cylinder of the internal combustion engine 60.

The intake pipe 61 is provided with a turbocharger 65, a venturi gas mixer 651 or a purge jet pump 652 at an upstream side of the throttle valve 613. The evaporation fuel V is supplied to the intake pipe 61 from the canister 50 through the purge jet pump 652 and the turbocharger 65.

The internal combustion engine 60 may be a naturally aspirated engine and not an engine with the turbocharger 65. In such a case, the evaporation fuel V may be supplied to the intake pipe 61 from the canister 50 at the downstream side of the throttle valve 613 through a purge control valve (not shown in the figures).

Moreover, the evaporation fuel V may be directly provided to the intake pipe 61 from the condenser 30 by the venturi gas mixer 651. Furthermore, the evaporation fuel V may be directly supplied to the intake pipe 61 of the internal combustion engine 60 from the first fuel tank 40.

The controller 70 is composed of a programmable computer. The controller 70 is input with output signals of various types of sensors, such as the concentration sensor provided at the raw fuel tank 10, the concentration sensor provided at the first fuel tank 40, and the atmospheric pressure sensor provided at the condenser 30 or the like, for detecting a state of the fuel supply system. The output signals of these sensors and an arithmetic processing results obtained based on the output signals are stored in a storing device configuring the controller 70.

The controller 70 is programmed to perform negative pressure control processing or the like. The controller 70 is programmed to execute arithmetic processing necessary for adjusting operation conditions of the separation device 20, adjusting fuel supplied to the internal combustion engine 60, and operation control of each pump and opening-closing or opening degree adjustment of each valve, as well as to execute fuel injection control and ignition timing control of the internal combustion engine 60.

"Programmed" means that the arithmetic processing unit such as a CPU or the like which is a component of the computer is configured to read out the software in addition to necessary information from a memory such as a ROM or RAM or the like or a record medium, and to execute arithmetic processing with respect to the information according to the software.

(Functions)

The functions of the fuel supply system having the aforementioned configuration and the content of the control processing executed by the controller 70 will be explained.

The concentration $C_2$ of the high-octane number component of raw fuel $F_0$ stored in the raw fuel tank 10 is measured and at least one of the first negative pressure P and the second negative pressure $P_2$ is adjusted so that the difference between the first negative pressure $P_1$ ($<P_2<0$) and the second negative pressure $P_2$ used in case of executing negative pressure control processing becomes smaller as the measured concentration $C_2$ is lower. "Negative pressure" is defined as a negative value with reference to an atmospheric pressure or a normal pressure. That is, the absolute value thereof becomes larger as the pressure is low compared to the atmospheric pressure.

Figure 3:
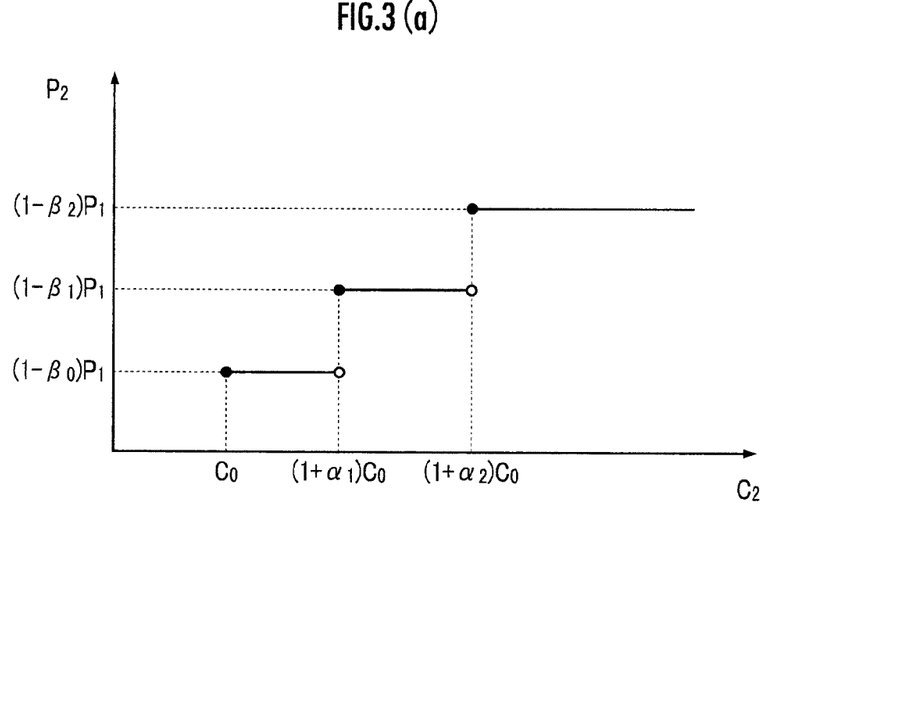
FIGS. 3(a) and 3(b) illustrate explanatory views regarding a negative pressure range adjustment in a negative pressure control process.

Here, an example is explained in which the first negative pressure $P_1$ is fixed, while the second negative pressure $P_2$ is adjusted according to a discontinuous increasing function having the concentration $C_2$ of the high-octane number component of raw fuel $F_0$ as a variable, as shown in FIG. 3(*a*).

Figure 2:
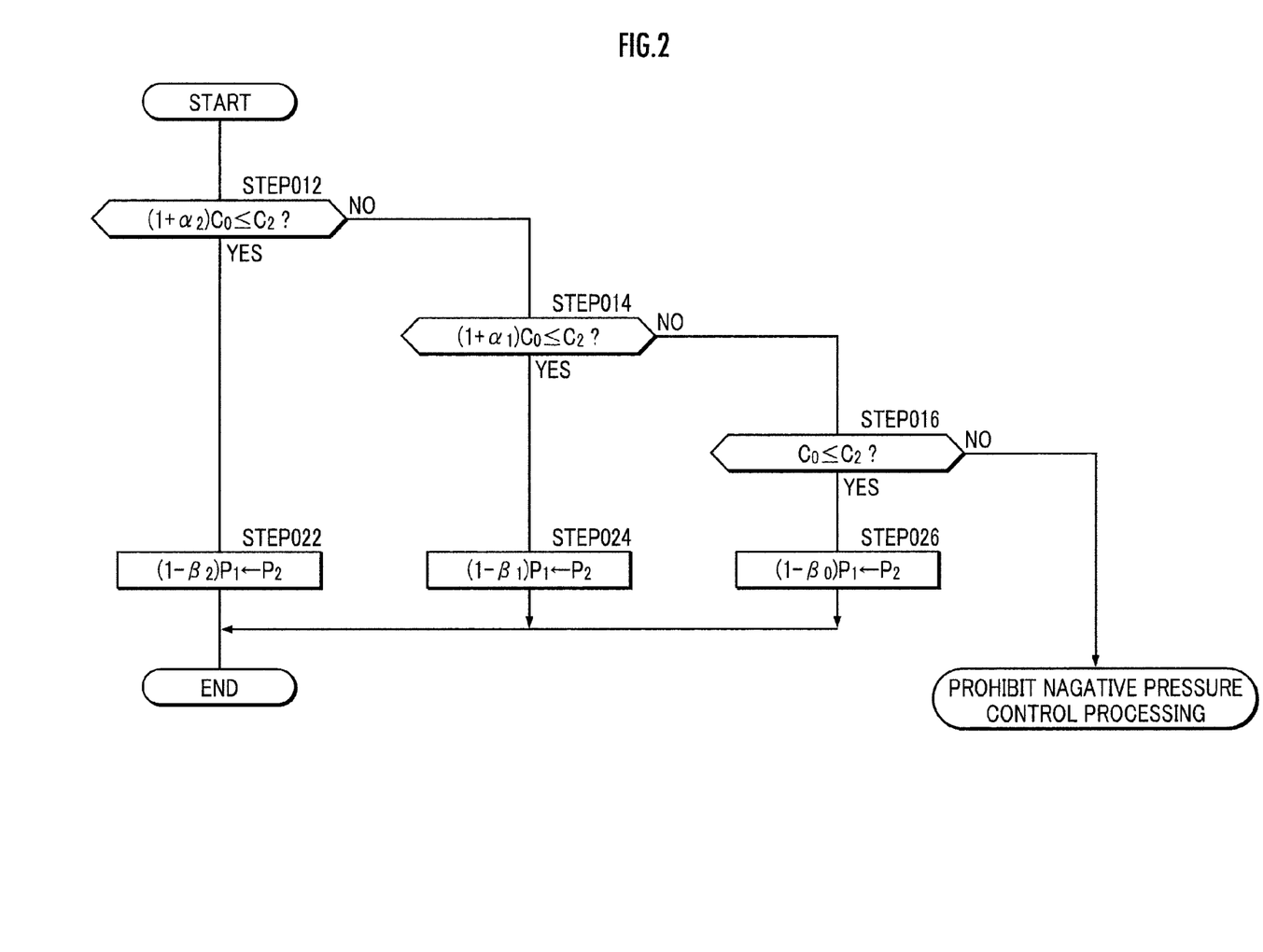
FIG. 2 illustrates an explanatory view showing functions of the fuel supply system.

Specifically, it is determined whether or not the measured concentration $C_2$ satisfies inequality expression (012) (FIG. 2/STEP 012)

$$(1+\alpha_2)C_0 \le C_2, (0<C_0<\alpha_2) \tag{012}$$

In a case the determination result is positive (FIG. 2/STEP012 ... YES), the second negative pressure $P_2$ is set to $(1-\beta_2)P_1$ $(0<\beta_2<1)$ (FIG. 2/STEP022). In a case the determination result is negative (FIG. 2/STEP012 ... NO), it is determined whether or not the measured concentration $C_2$ satisfies inequality expression (014) (FIG. 2/STEP014).

$$(1+\alpha_1)C_0 \le C_2, (0<\alpha_1<\alpha_2) \tag{014}$$

In a case the determination result is positive (FIG. 2/STEP014... YES), the second negative pressure $P_2$ is set to $(1-\beta_1)P_1$ $(0<\beta_1<\beta_2)$ (FIG. 2/STEP024). In a case the determination result is negative (FIG. 2/STEP014 ... NO), it is determined whether or not the measured concentration $C_2$ satisfies inequality expression (016) (FIG. 2/STEP016).

$$C_0 \le C_2 \tag{016}$$

In a case the determination result is positive (FIG. 2/STEP016...YES), the second negative pressure $P_2$ used in case of executing negative pressure control processing is set to $(1-\beta_0)P_1(0<\beta_0<\beta_1)$ (FIG. 2/STEP026). In a case the determination result is negative (FIG. 2/STEP016 ... NO), the second negative pressure P2 is not adjusted and the execution of the negative pressure control processing is inhibited.

By this processing, the second negative pressure P2 is set to be lower stepwise as the concentration $C_2$ of the high-octane number component of raw fuel $F_0$ is lower (refer to FIG. 3(*a*)). In addition, as shown in FIG. 3(*b*), the second negative pressure $P_2$ may be set to be lower continuously as the concentration $C_2$ is lower. By this, the width of the negative pressure range $[P_1, P_2]$ is set narrower continuously or discontinuously as the concentration $C_2$ is lower.

Moreover, in addition to the second negative pressure $P_2$, the first negative pressure $P_1$ may be adjusted so that width of the negative pressure range $[P_1, P_2]$ is narrower as the concentration $C_2$ is lower. As an example, a case where a first reference negative pressure $P_{10}$ ($<P_{20}<0$) and a second reference negative pressure $P_{20}$ are defined according to a reference concentration $C_{20}$, and the concentration $C_2$ is lower than the reference concentration $C_{20}$, is considered.

In such case, the second negative pressure $P_2$ may be adjusted to a value $(P_{20}-\xi\Delta P)$ which is lower than the second reference negative pressure $P_{20}$ by $\xi\Delta P$ $(0<\Delta P, 0<\xi<1)$, and the first negative pressure $P_1$ may be adjusted to a value $(P_{10}+(1-\xi)\Delta P)$, which is higher than the first reference negative pressure $P_{10}$ by $(1-\xi)\Delta P$, so that the width of the negative pressure range $[P_1, P_2]$ becomes narrower compared to a case where the concentration $C_2$ equals to the reference concentration $C_{20}$. In such occasion, it is preferable that $\xi$ is set to a value larger than 0.5 so that the adjustment width $\xi\Delta P$ of the second negative pressure $P_2$ becomes larger than the adjustment width $(1-\xi)\Delta P$ of the first negative pressure $P_1$.

In a case where the second fuel $F_2$ recovered from the separation device 20 is stored not in the raw fuel tank 10 but in a second fuel tank separate from the raw fuel tank 10, after the adjustment of the second negative pressure $P_2$ according to the concentration $C_2$ of the high-octane number component of raw fuel $F_0$ has been once executed, the adjustment may be abbreviated according to a user's selection or automatically. For example, whether or not to abbreviate the adjustment is determined by a vehicle mounted device or a portable device being operated by the user in a predetermined manner, and a signal indicating whether or not such selection exists is sent to the controller 70 from the device.

(Degradation Correction Processing)

After the second negative pressure P 2 is set as above, a degradation correction processing which appropriately corrects the second negative pressure P2 according to the estimated condition of the separation device 20, is executed.

Figure 4:
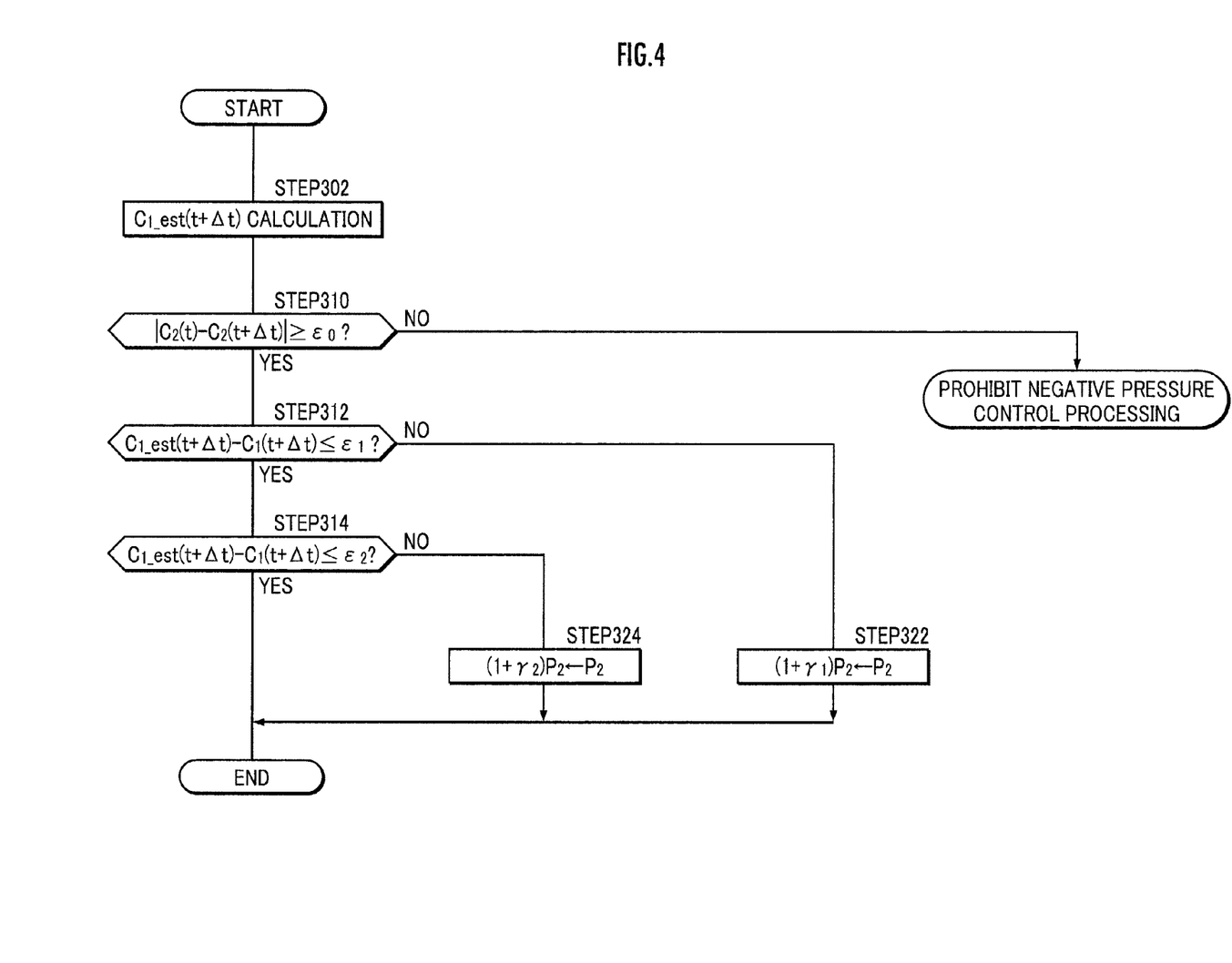
FIG. 4 illustrates an explanatory view regarding a deterioration correction process.

Specifically, under the assumption that the separation device 20 is in normal condition, based on a measurement result of a concentration $C_1(t)$ of the high-octane number component of the first fuel $F_1$ at a certain time point t or the like, the concentration $C_{1\_est}(t+\Delta t)$ of the high-octane number component of the first fuel $F_1$ at a future designated time point $t+\Delta t$ $(0<\Delta t)$ is estimated (FIG. 4/STEP302).

Based on a measurement result at the certain time point t of each of a storage amount $V_1$ and the concentration $C_1$ of the high-octane number component of the first fuel $F_1$, and the concentration $C_2$ of the high-octane number component of the raw fuel $F_0$, the estimated concentration $C_{1\_est}(t+\Delta t)$ is calculated based on expression (302), for example. The storage amount $V_1$ of the first fuel $F_1$ is, for example, measured based on an output signal of a storage amount sensor provided at the first fuel tank 40. The storage amount sensor is, for example, configured of a sensor recited in Japanese Patent Laid-open Publication No. 2008-267310.

$$C_{1\_est}(t+\Delta t)=\{C_1(t)V_1(t)+\eta C_2(t)\times V\Delta t\}/(V_1(t)+V\Delta t) \quad (302).$$

"η" is an index expressing a fuel separation performance of the separation device 20 (or the separation membrane 21) in the normal state. This means that a concentration of the high-octane number component of the first fuel $F_1$ recovered from the raw fuel $F_0$ by the separation device 20 in the normal state is expressed by "$\eta C_2$". The value of the index η may be corrected according to a fuel separation condition such as a temperature of the raw fuel $F_0$ and a temperature of the separation device 20 or the like. "V" is a supply amount of the raw fuel $F_0$ with respect to the separation device 20 per unit time, and it is measured based on, for example, an output signal of a flow amount sensor provided at the connection path of the raw fuel tank 10 and the separation device 20.

Here, the estimated concentration $C_{1\_est}(t+\Delta t)$ of the high-octane number component of the first fuel $F_1$ may be obtained according to expression (304) based on a decrement amount $\Delta V_2$ from an initial value $V_{20}$ of the storage amount $V_2$ of the raw fuel $F_0$ and a decrease amount $\Delta C_2$ from an initial value $C_{20}$ of the concentration $C_2$ of the high-octane number component of the raw fuel $F_0$. The storage amount $V_2$ of the raw fuel $F_0$ is measured, for example, based on an output signal of a storage amount sensor provided at the raw fuel tank 10.

$$C_{1\_est}(t+\Delta t)=\{V_{20}C_{20}-(V_{20}-\Delta V_2)(C_{20}-\Delta C_2)\}/\Delta V_2 \quad (304).$$

It is determined whether or not a variation amount of the high-octane number component of the raw fuel $F_0|C_2(t)-C_2(t+\Delta t)|$ is equal to or more than a reference value $\epsilon_0$ (FIG. 4/STEP310). In a case where the determination result is negative (FIG. 4/STEP310 . . . NO), the execution of the negative pressure control processing is prohibited. This is because there is a high probability that the separation device 20 is deteriorated noticeably, and from this point of view, the reference value $\epsilon_0$ is set, for example, to a minute positive value.

In a case where it is determined that the variable amount is equal to or more than the reference value $\epsilon_0$ (FIG. 4/STEP310 . . . YES), it is determined whether or not a deviation between the estimated result $C_{1\_est}(t+\Delta t)$ and the measured result $C_1(t+\Delta t)$ at the designated time point $(t+\Delta t)$ of the concentration $C_1$ of the high-octane number component of the first fuel $F_1$, is equal to or less than a first threshold value $\epsilon_1$ which is a positive value (FIG. 4/STEP312).

In a case where the determination result is negative (FIG. 4/STEP312 . . . NO), the second negative pressure $P_2$ is corrected to $(1+\gamma_1) P_2$ $(0<\gamma_1)$ (FIG. 4/STEP322). For example, in a case where the second negative pressure P2 is adjusted to $(1-\beta_1)P_1$ as above, the second negative pressure $P_2$ is adjusted to $(1+\gamma_1)(1-\beta_1)P_1$ by the degradation correction processing. Furthermore, in a case where the second negative pressure $P_2$ is adjusted to $(1-\beta_2)P_1$, the second negative pressure $P_2$ is adjusted to $(1+\gamma_1)(1-\beta_2)P_1$ by the degradation correction processing.

In a case where it is determined that the deviation is equal to or less than a first threshold value $\epsilon_1$ (FIG. 4/STEP 312 . . . YES), it is determined whether or not the deviation $C_{1\_est}(t+\Delta t)-C_1(t+\Delta t)$ is equal to or less than a second threshold value $\epsilon_2$ which is a positive value smaller than the first threshold value $\epsilon_1$ (FIG. 4/STEP 314).

In a case where the determination result it negative (FIG. 4/STEP314 . . . NO), the second negative pressure $P_2$ is corrected to $(1+\gamma_2) P_2$ $(0<\gamma_2<\gamma_1)$ (FIG. 4/STEP324). For example, in a case where the second negative pressure $P_2$ is adjusted to $(1-\beta_1)P_1$ as above, the second negative pressure $P_2$ is adjusted to $(1+\gamma_2)(1-\beta_1)P_1$ by the degradation correction processing. Furthermore, in a case where the second negative pressure $P_2$ is adjusted to $(1-\beta_2)P_1$, the second negative pressure $P_2$ is adjusted to $(1+\gamma_2)(1-\beta_2)P_1$ by the degradation correction processing.

In a case where it is determined that the deviation is equal to or less than a second threshold value $\epsilon_2$ (FIG. 4/STEP 314 . . . YES), the second negative pressure $P_2$ is maintained at a value as it is.

According to the above processing, the second negative pressure $P_2$ is corrected so as to beome intermittently low in two steps as the deviation $C_{1\_est}(t+\Delta t)-C_1(t+\Delta t)$ is larger. By determining the magnitude relationship between the deviation and each of the three or more different threshold values, the second negative pressure $P_2$ may be corrected so as to beome intermittently low in three or more number of steps as the deviation is larger. Moreover, the second negative pressure $P_2$ may be corrected so as to beome continuously low as the deviation is larger according to a continuously decreasing function having the deviation as a variable.

The determination processing of the magnitude relationship between the variable amount of the concentration $C_2$ of the high-octane number component of the raw fuel $F_0|C_2(t)-C_2(t+\Delta t)|$ and the reference value $\epsilon_0$ (FIG. 4/STEP310), and the execution prohibit processing of the negative pressure control processing according to the result of the determination processing, may be abbreviated. The second negative pressure P2 may be corrected to become continuously low as the variable amount is higher. In such case, the correction processing of the second negative pressure $P_2$ according to the magnitude of the deviation may be abbreviated. The execution of the degradation correction processing may be abbreviated.

The high-low of the degree of the deterioration of the separation device 20 may be determined according to the magnitude of at least one of the variable amount $|C_2(t)-C_2$ (t+Δt)| and the deviation $C_{1\_est}(t+\Delta t) - C_1(t+\Delta t)$, and the determination result may be used for processing other than the correction of the second negative pressure $P_2$. For example, the supply amount of the raw fuel $F_0$ with respect to the separation device 20 may be reduced as the deterioration degree is higher.

(Negative Pressure Control Processing (First Embodiment))

"Negative pressure control processing" is repeatedly executed by the controller 70 according to the steps which will be explained hereinafter.

The condenser 30 is depressurized by the operation of the vacuum pump 36 in a first state. The first state means a state in which the fourth opening-closing mechanism 34 is opened while the first opening-closing mechanism 31, the second opening-closing mechanism 32, and the third opening-closing mechanism 33 are closed. In this state, it is determined whether or not internal pressure P of the condenser 30 has reached to be equal to or less than a first negative pressure Pi (FIG. 5/STEP 102).

Figure 5:
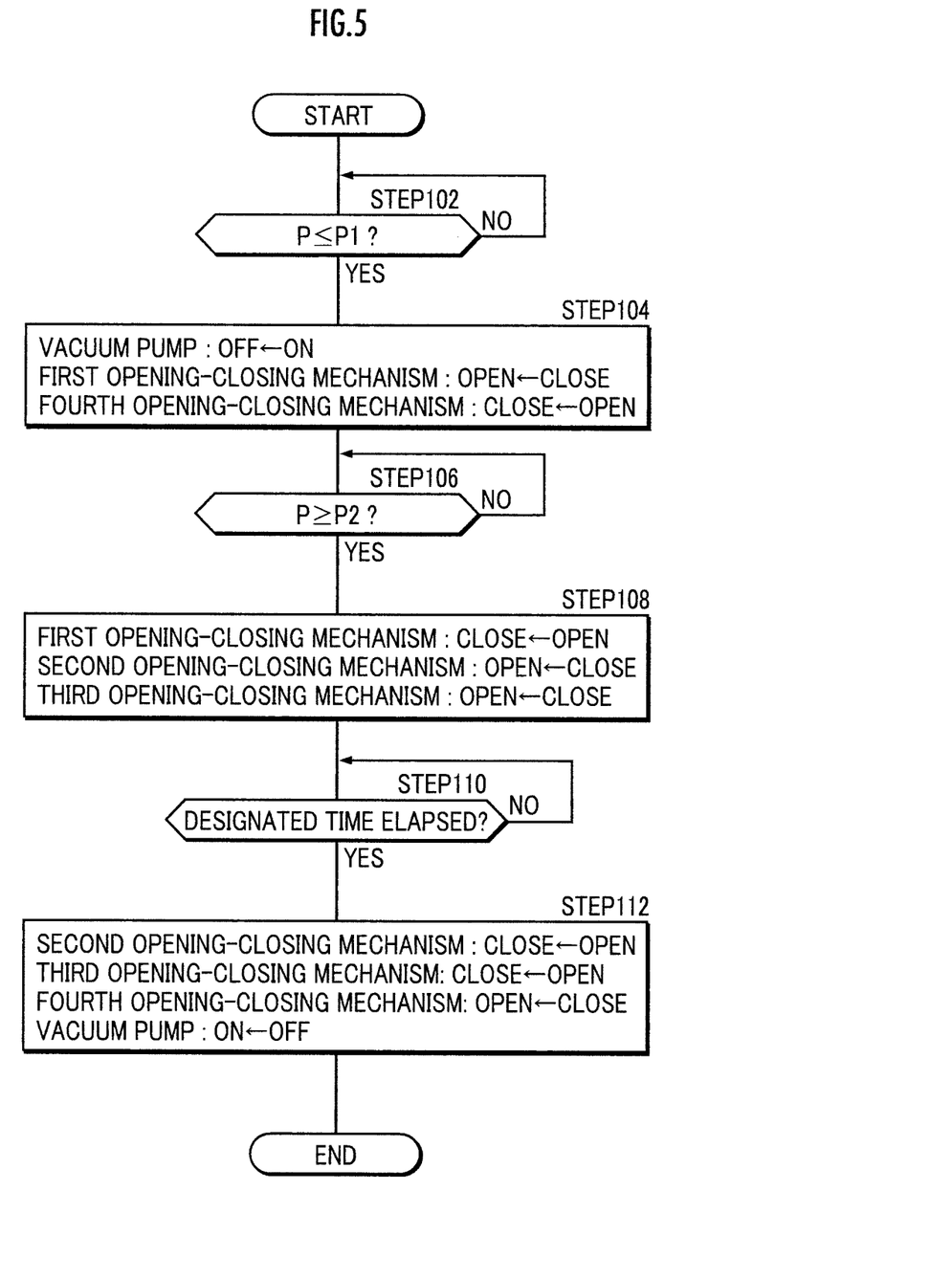
FIG. 5 illustrates an explanatory view regarding a negative pressure control process (first embodiment)

In a case where the above determination result is positive (FIG. 5/STEP 102 . . . YES), the first opening-closing mechanism 31 is opened (FIG. 5/STEP 104). By this, a second state is realized in which the first opening-closing mechanism 31 is opened while the second opening-closing mechanism 32, the third opening-closing mechanism 33, and the fourth opening-closing mechanism 34 are closed. Also, the operation of the vacuum pump 36 is stopped (FIG. 5/STEP 104).

Here, the operation of the vacuum pump 36 may be stopped and the first opening-closing mechanism 31 may be opened (refer to FIG. 5/STEP 104) after a first designated time has elapsed from starting the operation of the vacuum pump 36 which will be described later (refer to FIG. 5/STEP 112).

Figure 6:
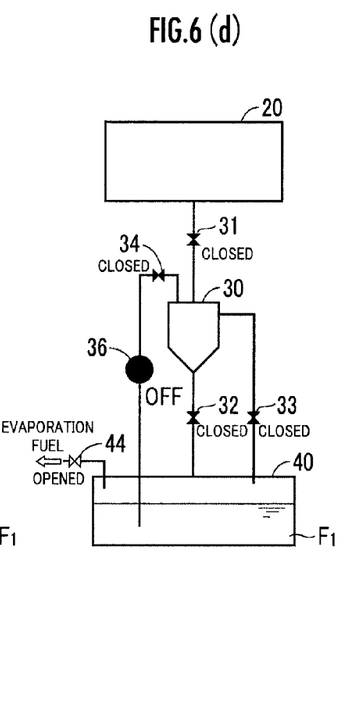
FIGS. 6(a)-6(d) illustrate explanatory views regarding an opening-closing process of a negative pressure control system of a first embodiment.

In the second state, the separation of the first fuel $F_1$ and the second fuel $F_2$ by the separation device 20 is started, and as shown by an arrow in FIG. 6(a), the first fuel $F_1$ in a gas phase state is supplied to the condenser 30 from the separation device 20. At least a part of the first fuel $F_1$ in the gas phase state is condensed (being phase transit from a gas phase to a liquid phase) in the condenser 30 which is in a negative pressure and a coolant state, and then retained. Moreover, the evaporation fuel V is increased in the condenser 30 by stopping the vacuum pump 36, and the internal atmospheric pressure of the condenser 30 is raised.

It is determined whether or not the internal atmospheric pressure P of the condenser 30 has reached to be equal to or higher than a second negative pressure value $P_2$ which is higher than the first negative pressure $P_1$ (FIG. 5/STEP 106). As mentioned before, since the negative pressure is defined as a negative value with reference to the atmospheric pressure, the absolute value of the second negative pressure $P_2$ is smaller than the absolute value of the first negative pressure $P_1$.

In a case where the above determination result is positive (FIG. 5/STEP 106 . . . YES), the first opening-closing mechanism 31 is closed while the second opening-closing mechanism 32 and the third opening-closing mechanism 33 are opened (FIG. 5/STEP 108). By this, a third state is realized in which the first opening-closing mechanism 31 and the fourth opening-closing mechanism 34 are closed while the second opening-closing mechanism 32 and the third opening-closing mechanism 33 are opened.

Here, the first opening-closing mechanism 31 may be closed while the second opening-closing mechanism 32 and the third opening-closing mechanism 33 are opened after a second designated time has elapsed from stopping the operation of the vacuum pump 36 and opening the first opening-closing mechanism 31 (refer to FIG. 5/STEP 108).

By closing the first opening-closing mechanism 31, the separation of the first fuel $F_1$ and the second fuel $F_2$ by the separation device 20 is stopped. By opening the second opening-closing mechanism 32, as shown in FIG. 6(b), the first fuel $F_1$ retained in the condenser 30 is supplied to the first fuel tank 40. Moreover, by opening the third opening-closing mechanism 33, as shown in FIG. 6(b), the evaporation fuel V is supplied to the condenser 30 from the first fuel tank 40, and the pressure of the condenser 30 is raised and equals to the pressure of the first fuel tank 40.

It is determined whether or not a designated time (for example, 10 [s]) has elapsed after the third state is realized (FIG. 5/STEP 110).

In a case where this determination result is positive (FIG. 5/STEP 110 . . . YES), both of the second opening-closing mechanism 32 and the third opening-closing mechanism 33 are closed while the fourth opening-closing mechanism 34 is opened (FIG. 5/STEP 112). By this, the first state is realized. Furthermore, the operation of the vacuum pump 36 is started (FIG. 5/STEP 112).

In the first state, as shown in FIG. 6(c), the evaporation fuel V (gas) is supplied to the first fuel tank 40 from the condenser 30 (refer to the arrow), and the internal atmospheric pressure P of the condenser 30 decreases. The evaporation fuel V induces bubbling of the first fuel F in the first fuel tank 40, and at least a part of the evaporation fuel V in the bubbles can be taken into the first fuel $F_1$ which is in the liquid phase state. In the first fuel tank 40, the first fuel $F_1$ is in a two phase state (gas phase-liquid phase), and by supplying the evaporation fuel V from the condenser 30, the pressure of the first fuel tank 40 is raised. The evaporation fuel V may be also supplied to a space which is filled with the evaporation fuel V in the first fuel tank 40 from the condenser 30.

After this, the process after the determination of comparing the internal atmospheric pressure P of the condenser 30 is repeated (refer to FIG. 5/STEP 102).

Moreover, the ECU 70 determines whether or not an opening condition of the first fuel tank 40 is satisfied during the execution of the negative pressure control processing. As the opening condition, a condition that the measured atmospheric pressure of the first fuel tank 40 becomes equal to or higher than a threshold value, or a condition that an acceleration request of the vehicle exceeding a threshold value was made, or a combination of these conditions may be adopted.

Then, in a case where it is determined that the opening condition is satisfied, a fourth state is realized in which the fifth opening-closing mechanism 44 is opened. On such occasion, for example, the first opening-closing mechanism 31, the second opening-closing mechanism 32, the third opening-closing mechanism 33, and the fourth opening-closing mechanism 34 are closed. In the fourth state, as shown in FIG. 6(d), the evaporation fuel V is emitted from the first fuel tank 40, and then supplied to the internal combustion engine 60 through the intake pipe 61.

(Second Embodiment)
(Configuration)

Figure 7:
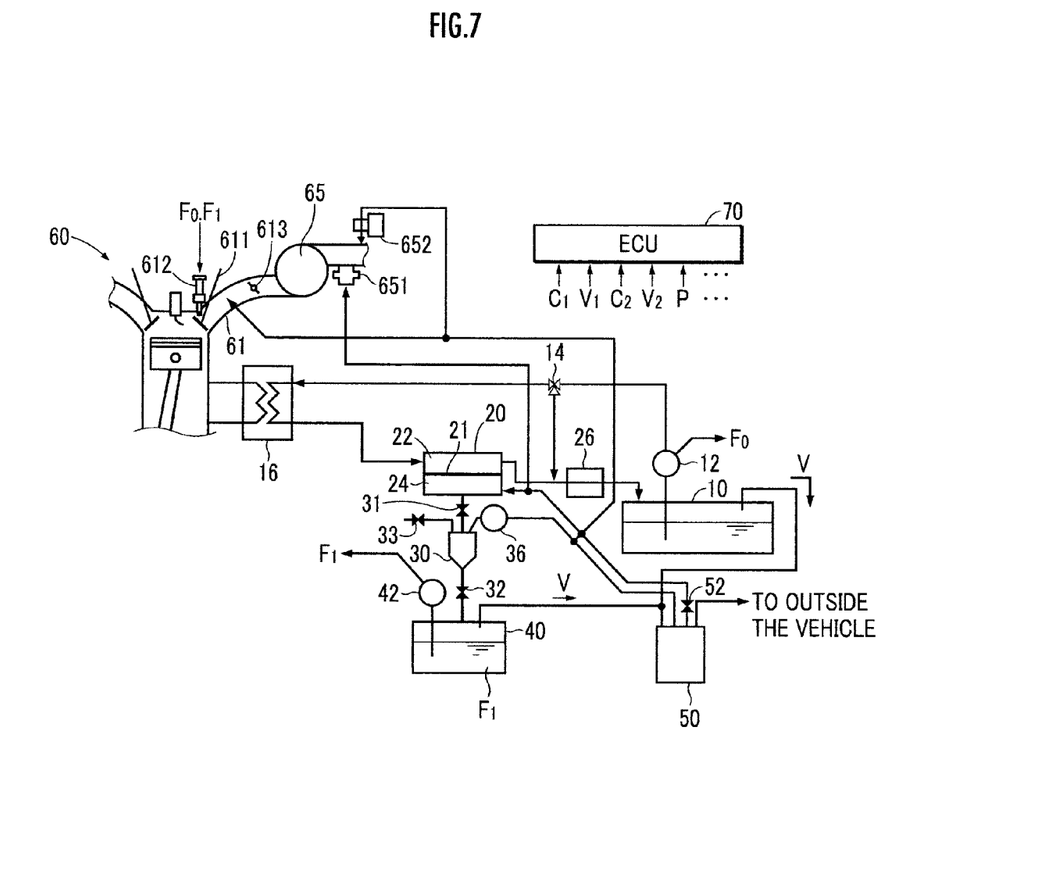
FIG. 7 illustrates an explanatory view showing features of a fuel supply system as a second embodiment of the present invention.

The fuel supply system in a second embodiment of the present invention as shown in FIG. 7, has the same features as the fuel supply system in the first embodiment of the present invention shown in FIG. 1. Therefore, the common features are indicated by the same reference numerals and the explanation thereof is abbreviated.

In the second embodiment, a third opening-closing mechanism 33 is provided in a path connecting a condenser 30 and an outside air atmosphere (whether inside or outside the vehicle). By opening the third opening-closing mechanism 33, it is configured to introduce outside air into the condenser. Here, it may be configured that the third opening-closing mechanism 33 is provided in a path connecting the condenser 30 and a canister 50 which is the air source, and an evaporation fuel V adsorbed to the canister 50 is introduced into the condenser 30 by opening the third opening-closing mechanism 33.

Moreover, a vacuum pump 36 is provided in a path connecting a first fuel tank 40 and the canister 50. This path is connected to a path connecting the canister 50 and a low pressure chamber 24 of a separation device 20. The fourth opening-closing mechanism 34 and the fifth opening-closing mechanism 44 shown in FIG. 1 are abbreviated. The three opening-closing mechanisms 31 to 33 and the vacuum pump 36 configure the atmospheric pressure adjustment mechanism of the present invention.

(Functions)

The functions of the fuel supply system having the aforementioned configuration and the content of a control processing executed by a controller 70 will be explained. In the second embodiment, an adjustment processing of the second negative pressure $P_2$ (refer to FIG. 2 and FIGS. 3(a)-3(b)) and a degradation correction processing (refer to FIG. 4) is executed similar to that of the first embodiment, and therefore their explanations will be abbreviated. On the other hand, in the second embodiment, the content of a negative pressure control processing differs compared to the first embodiment according to the difference in their configuration, which will be explained hereinafter.

(Negative Pressure Control Processing (Second Embodiment))

By the operation of the vacuum pump 36 in a first state, the condenser 30 is decompressed. "The first state" means a state in which the first opening-closing mechanism 31, the second opening-closing mechanism 32, and the third opening-closing mechanism 33 are closed. In this state, it is determined whether or not the internal atmospheric pressure P of the condenser 30 has reached to be equal to or less than a first negative pressure $P_1$ (FIG. 8/STEP202).

Figure 8:
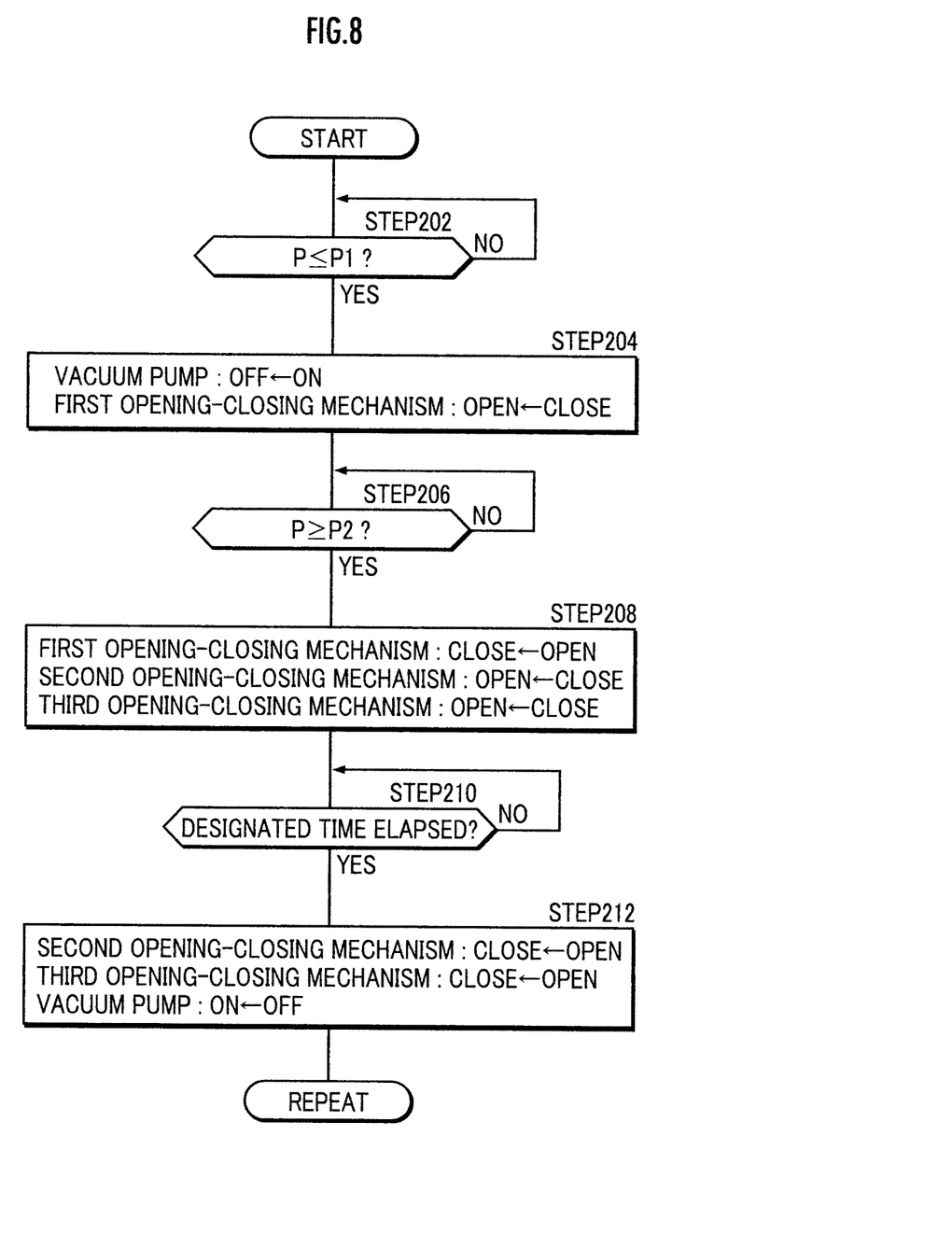
FIG. 8 illustrates a flow chart showing steps of a negative pressure control process (second embodiment)

In a case where the above determination result is positive (FIG. 8/STEP 202 . . . YES), the operation of the vacuum pump 36 is stopped and also the first opening-closing mechanism 31 is opened (FIG. 8/STEP204). By this, a second state is realized in which the first opening-closing mechanism 31 is opened, while the second opening-closing mechanism 32 and the third opening-closing mechanism 33 are closed.

Figure 9:
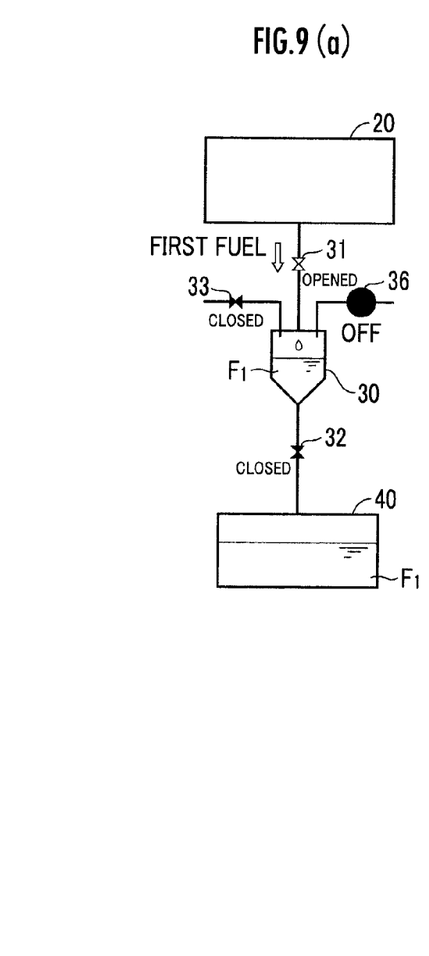
FIGS. 9(a)-9(c) illustrate explanatory views regarding an opening-closing process of a negative pressure control system of a second embodiment.

In the second state, the separation of the first fuel $F_1$ and the second fuel $F_2$ is started by the separation device 20, and the first fuel $F_1$ in a gas phase state is supplied to the condenser 30 from the separation device 20 as indicated by an arrow in FIG. 9(a). At least a part of the first fuel $F_1$ in the gas phase state is condensed (being phase transit from the gas phase to the liquid phase) in the condenser 30 which is in a negative pressure and a coolant state, and then retained. Moreover, by stopping the vacuum pump 36, the evaporation fuel V is increased in the condenser 30 and the internal atmospheric pressure of the condenser 30 is raised.

It is determined whether or not the internal atmospheric pressure P of the condenser 30 has reached to be equal to or higher than a second negative pressure $P_2$ which is higher than the first negative pressure $P_1$ (FIG. 8/STEP206). In a case where the above determination result is positive (FIG. 8/STEP 206 . . . YES), the first opening-closing mechanism 31 is closed, while the second opening-closing mechanism 32 and the third opening-closing mechanism 33 are opened (FIG. 8/STEP208). By this a third state is realized in which the first opening-closing mechanism 31 is closed while the second opening-closing mechanism 32 and the third opening-closing mechanism 33 are opened.

It is determined whether or not a designated time (for example, 10 [s]) has elapsed since the third state is realized (FIG. 8/STEP210). In a case where this determination result is positive (FIG. 8/STEP 210 . . . YES), by closing both of the second opening-closing mechanism 32 and the third opening-closing mechanism 33, the first state is realized again and the operation of the vacuum pump 36 is started (FIG. 8/STEP212).

After this, the process after the determination of comparing the internal atmospheric pressure P of the condenser 30 is repeated (refer to FIG. 8/STEP 202). The sufficiency of an opening condition is not determined like the first embodiment, and the evaporation fuel V is constantly emitted from the first fuel tank 40 and supplied to the canister 50.

(Effect)

According to the fuel supply system of the present invention, the first fuel $F_1$ (high-octane number fuel) in a gas phase state flows into the condenser 30 from the separation device 20 in the second state, and as the internal atmospheric pressure P (negative pressure) of the condenser 30 rises, the fuel separation efficiency by the separation device 20 has a tendency to gradually degrade. This tendency is noticeable as the concentration $C_2$ of the high-octane number component of the raw fuel $F_0$ is lower.

Therefore, at least one of the first negative pressure $P_1$ and the second negative pressure $P_2$ is adjusted so that a width of the negative pressure range [$P_1$, $P_2$] of the condenser 30 in the second state, that is, the difference between the first and the second negative pressure $P_2$–$P_1$, becomes smaller as the concentration $C_2$ of the high-octane number component of raw fuel $F_0$ is low (refer to FIG. 2 and FIGS. 3(a)-3(b)). By this, the term until the internal atmospheric pressure P of the condenser 30 rises from the first negative pressure $P_1$ to the second negative pressure $P_2$ in the negative pressure control processing, that is, the term which the second state is maintained, is shortened (refer to FIG. 5/STEP 102 . . . YES~STEP 106 . . . YES, FIG. 6(b), FIG. 8/STEP202 . . . YES~STEP206 . . . YES, and FIG. 9(b)).

Therefore, in spite of the high probability that the fuel separation efficiency by the separation device 20 is low, a situation in which the second state is maintained vainly for a long time is avoided. Furthermore, to the extent that this term is shortened, the number of times the negative pressure control processing is repeated, is increased, thus the increase of an accumulated recovery amount of the first fuel $F_1$ with high concentration of high-octane number component is attained.

Moreover, at least the second negative pressure $P_2$ is adjusted to be lower as the concentration $C_2$ of the high-octane number component contained in the raw fuel $F_0$ is lower (refer to FIG. 2/STEP022~026). By this, the position of the negative pressure range [$P_1$, $P_2$] of the condenser 30 in the second state is adjusted to the low pressure side. Therefore, a situation in which the negative pressure of the condenser in the second state being insufficiently-low can be avoided from a view point of fuel separation efficiency of the separation device.

Moreover, in a situation that the deterioration of the separation device 20 is advancing and there is a high probability of having difficulty to recover a first fuel $F_1$ with much high-octane number component, the second negative pressure $P_2$ is adjusted to become low (refer to FIG. 4/STEP322, 324). By this, the term of the second state being maintained is shortened. Therefore, it can avoid maintaining the second state vainly for a long time. Due to the shortening of this term, the number of times the negative pressure control processing is repeated is increased, thus the improvement of recovery efficiency of the first fuel $F_1$ is attained.

(Another Embodiment of the Present Invention)

For each negative pressure control period, the first state and the second state may be changed alternately for a plurality of times, and then the third state may be realized.

The evaporation fuel V may be supplied to a condenser 30 from a first fuel tank 40 through a second collecting path when a second opening-closing mechanism 32 is in an opened state and the third opening-closing mechanism 33 is abbreviated. By this, it is able to raise the pressure of the condenser 30 and also to supply the first fuel $F_1$ to the first fuel tank 40 from the condenser 30 through a common path.

In such case, a sequence of a state in which a first opening-closing mechanism 31 and the second opening-closing mechanism 32 are closed and a state in which one of the first opening-closing mechanism 31 and the second opening-closing mechanism 32 is opened, may be realized repeatedly by a controller 70. Furthermore, a vacuum pump 36 may be operated in the state in which the first opening-closing mechanism 31 and the second opening-closing mechanism 32 are closed while the operation of the vacuum pump 36 may be stopped in the state in which one of the first opening-closing mechanism 31 and the second opening-closing mechanism 32 is opened.

The invention claimed is:

1. A fuel supply system configured to supply a first fuel which is separated from a raw fuel and containing components with a higher octane number compared to the raw fuel, and the raw fuel or a second fuel which is separated from the raw fuel and containing components with a lower octane number compared to the raw fuel, selectively or by a specified mixing ratio to an internal combustion engine simultaneously, comprising:
   a separation device which is sectioned to a high pressure chamber and a low pressure chamber via a separation membrane, and configured to separate the raw fuel into the first fuel and the second fuel by the separation membrane in a state the low pressure chamber is maintained in a lower pressure than the high pressure chamber, and then to recover the first fuel from the low pressure chamber side, and to recover the second fuel from the high pressure chamber side;
   a condenser which is connected to the low pressure chamber of the separation device;
   a first fuel tank connected to the condenser and configured to store the first fuel;
   an atmospheric pressure adjustment mechanism configured to adjust an internal atmospheric pressure of the condenser; and
   a controller configured to repeatedly execute a negative pressure control processing by controlling an operation of the atmospheric pressure adjustment mechanism, in which, in a first state where the condenser is interrupted from the separation device and the first fuel tank, the condenser is decompressed to a first negative pressure and then the decompression of the condenser is stopped, and subsequently in a second state where the condenser is communicated to the separation device while interrupted from the first fuel tank, the internal atmospheric pressure of the condenser is raised to a second negative pressure, and then in a third state where the condenser is interrupted from the separation device while communicated to the first fuel tank, the decompression of the condenser is also stopped,
   wherein the controller is configured to adjust at least one of the first negative pressure and the second negative pressure so as to make a difference between the first negative pressure and the second negative pressure smaller as a concentration of the high-octane number components of the raw fuel is lower.

2. A fuel supply system according to claim 1, wherein the controller is configured to adjust the second negative pressure to be lower as the concentration of the high-octane number components of the raw fuel is lower.

3. A fuel supply system according to claim 2, wherein the fuel supply system is configured that the second fuel separated by the separation device is supplied to a raw fuel tank in which the raw fuel is stored.

4. A fuel supply system according to claim 3, wherein the controller is configured to adjust at least one of the first negative pressure and the second negative pressure so that the difference between the first negative pressure and the second negative pressure becomes smaller as a degree of deterioration of the separation device is higher, the degree of deterioration being estimated based on a time-series measurement result of at least one of a concentration of the high-octane number components of the first fuel and the concentration of the high-octane number components of the raw fuel.

5. A fuel supply system according to claim 4, wherein the controller is configured to adjust at least one of the first negative pressure and the second negative pressure, based on a measurement result of the concentration of the high-octane number components of the first fuel, according to a definition that the degree of deterioration of the separation device is higher as a deviation between an estimated concentration of the high-octane number components of the first fuel at a future designated time point determined on an assumption that the separation device is normal and a measurement result at the designated time point of the concentration of the high-octane number components of the first fuel stored in the first fuel tank, is larger.

6. A fuel supply system according to claim 4, wherein the controller is configured to adjust at least one of the first negative pressure and the second negative pressure according to a definition that the degree of deterioration of the separation device is higher as a time rate of change of the concentration of the high-octane number components of the raw fuel is lower.

7. A fuel supply system according to claim 5, wherein the controller is configured to adjust at least one of the first negative pressure and the second negative pressure according to a definition that the degree of deterioration of the separation device is higher as a time rate of change of the concentration of the high-octane number components of the raw fuel is lower.

* * * * *